(12) United States Patent
Harada et al.

(10) Patent No.: US 8,755,001 B2
(45) Date of Patent: Jun. 17, 2014

(54) LIQUID CRYSTAL DISPLAY APPARATUS INCLUDING A RESIN LAYER IN A REGION ENCLOSED BY A SPACER BETWEEN AN OPTICAL SHEET AND A PROTECTIVE PLATE

(75) Inventors: Tatsuhito Harada, Hino (JP); Masayuki Takahashi, Asaka (JP); Masami Morikawa, Fussa (JP); Masaki Tsuji, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 1180 days.

(21) Appl. No.: 12/632,974

(22) Filed: Dec. 8, 2009

(65) Prior Publication Data

US 2010/0149452 A1    Jun. 17, 2010

(30) Foreign Application Priority Data

Dec. 11, 2008  (JP) ................................. 2008-315966

(51) Int. Cl.
  *G02F 1/1333* (2006.01)
  *G02F 1/1335* (2006.01)

(52) U.S. Cl.
  USPC ................ 349/58; 349/96; 349/122; 349/138

(58) Field of Classification Search
  CPC .................... G02F 1/133603; G02F 1/133608; G02F 2202/28; G02F 1/13394
  USPC ....................... 349/58, 96, 122, 138
  See application file for complete search history.

(56) References Cited

U.S. PATENT DOCUMENTS

| 6,833,953 | B2 | 12/2004 | Miyazawa et al. |
| 7,009,771 | B2 * | 3/2006 | Bourdelais et al. ........... 359/599 |
| 7,727,847 | B2 * | 6/2010 | Tanaka et al. ................ 438/314 |
| 7,830,595 | B2 | 11/2010 | Hinata et al. |
| 7,961,281 | B2 | 6/2011 | Tsuji et al. |

(Continued)

FOREIGN PATENT DOCUMENTS

| JP | 3-204616 A | 9/1991 |
| JP | 6-337411 A | 12/1994 |

(Continued)

OTHER PUBLICATIONS

Taiwanese Office Action dated Feb. 25. 2013 (and English translation thereof) in counterpart Taiwanese Application No. 098142180.

(Continued)

*Primary Examiner* — Huyen Ngo
(74) *Attorney, Agent, or Firm* — Holtz Holtz Goodman & Chick PC

(57) ABSTRACT

A liquid crystal display apparatus includes a liquid crystal display panel having a substrate to which an optical sheet is affixed, a protective plate disposed so that the optical sheet intervenes between the protective plate and the substrate and so that a predetermined space is formed between the protective plate and the optical sheet, a spacer disposed between the liquid crystal display panel and the protective plate, and a resin layer in a region enclosed by the spacer that is polymerized after filling. The area of the substrate is greater than the area of the optical sheet. The spacer has a frame shape corresponding to the outer shape of the optical sheet. And the spacer is located on edges of the optical sheet such that inner end faces of the spacer are located inward relative to outer end faces of the optical sheet.

10 Claims, 4 Drawing Sheets

(56) References Cited

U.S. PATENT DOCUMENTS

| | | | |
|---|---|---|---|
| 8,142,249 | B2 | 3/2012 | Kobayashi et al. |
| 8,284,344 | B2 * | 10/2012 | Harada .......................... 349/58 |
| 8,411,223 | B2 * | 4/2013 | Tsuji et al. ...................... 349/58 |
| 2006/0262260 | A1 | 11/2006 | Majumdar et al. |
| 2007/0070477 | A1 | 3/2007 | Eto et al. |
| 2007/0071909 | A1 | 3/2007 | Eun et al. |
| 2007/0097299 | A1 | 5/2007 | Watanabe et al. |
| 2007/0109650 | A1 | 5/2007 | Yamada et al. |
| 2007/0132911 | A1 | 6/2007 | Fujiwara et al. |
| 2007/0252922 | A1 | 11/2007 | Oohira |
| 2007/0267134 | A1 | 11/2007 | Konarski et al. |
| 2008/0106675 | A1 | 5/2008 | Uesaka et al. |
| 2008/0297685 | A1 | 12/2008 | Sugibayashi et al. |
| 2009/0011197 | A1 | 1/2009 | Matsuhira |
| 2010/0231821 | A1 | 9/2010 | Tsuji et al. |
| 2010/0231837 | A1 | 9/2010 | Harada et al. |
| 2010/0245707 | A1 | 9/2010 | Harada |
| 2011/0070799 | A1 | 3/2011 | Tsuji et al. |

FOREIGN PATENT DOCUMENTS

| | | |
|---|---|---|
| JP | 8-6503 A | 1/1996 |
| JP | 2529118 Y2 | 3/1997 |
| JP | 10-214032 A | 8/1998 |
| JP | 11-174417 A | 7/1999 |
| JP | 2000-075306 A | 3/2000 |
| JP | 2000-221512 A | 8/2000 |
| JP | 2002-347155 A | 12/2002 |
| JP | 2003-215344 A | 7/2003 |
| JP | 2005-55641 A | 3/2005 |
| JP | 2005-114789 A | 4/2005 |
| JP | 2005-179481 A | 7/2005 |
| JP | 2006-163742 A | 6/2006 |
| JP | 2006-189715 A | 7/2006 |
| JP | 2006-195209 A | 7/2006 |
| JP | 2007-114737 A | 5/2007 |
| JP | 2007-164154 A | 6/2007 |
| JP | 2008-170753 A | 7/2008 |
| JP | 2008-209510 A | 9/2008 |
| JP | 2008-241728 A | 10/2008 |
| JP | 2008-281997 A | 11/2008 |
| JP | 2009-8703 A | 1/2009 |
| JP | 2009-069333 A | 4/2009 |
| JP | 2009-075217 A | 4/2009 |
| JP | 2009-86187 A | 4/2009 |
| JP | 2009-086188 A | 4/2009 |
| JP | 2009-109855 A | 5/2009 |
| JP | 2009-175701 A | 8/2009 |
| KR | 100465678 B1 | 12/2004 |
| KR | 10-2008-0032116 A | 4/2008 |
| TW | M264519 U | 5/2005 |
| TW | 200838968 A | 10/2008 |

OTHER PUBLICATIONS

Korean Office Action dated Apr. 11, 2011 (and English translation thereof) in counterpart Korean Application No. 10-2009-0121003.
Japanese Office Action dated Nov. 2, 2010 (and English translation thereof) in counterpart Japanese Application No. 2008-315966.

* cited by examiner

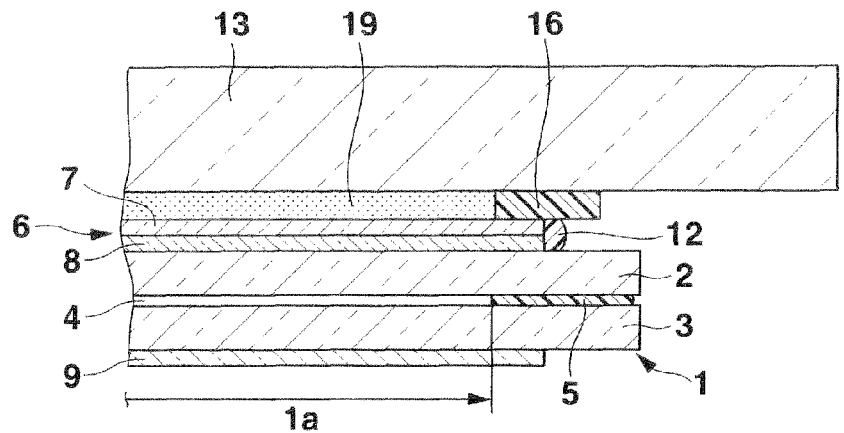
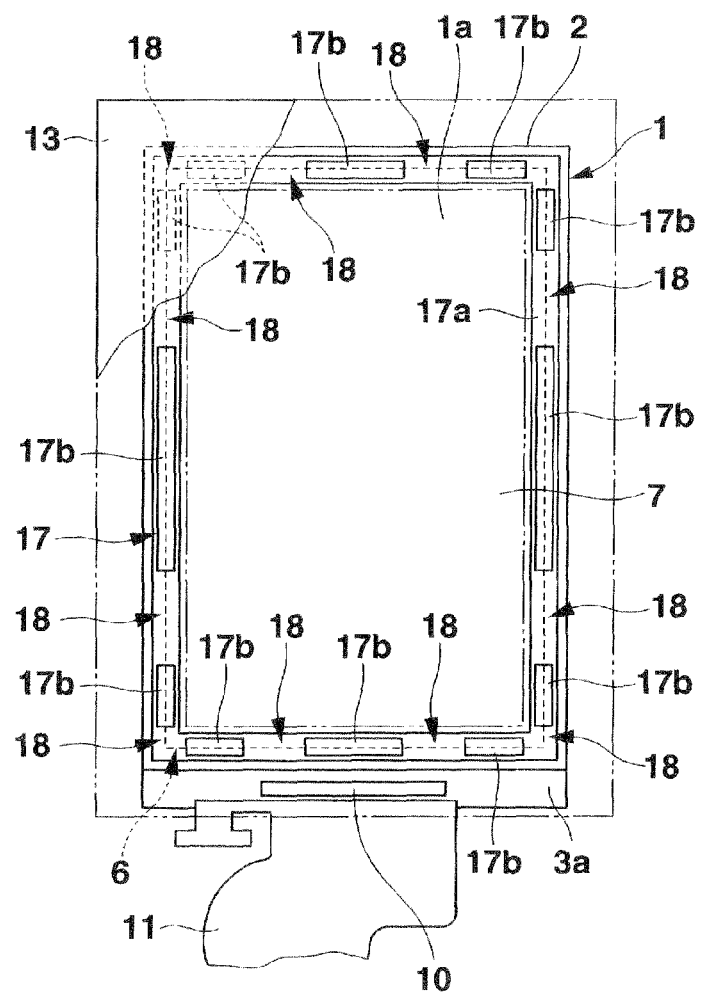

LIQUID CRYSTAL DISPLAY APPARATUS INCLUDING A RESIN LAYER IN A REGION ENCLOSED BY A SPACER BETWEEN AN OPTICAL SHEET AND A PROTECTIVE PLATE

CROSS-REFERENCE TO RELATED APPLICATIONS

This application is based upon and claims the benefit of priority from prior Japanese Patent Application No. 2008-315966, filed Dec. 11, 2008, the entire contents of which are incorporated herein by reference.

BACKGROUND OF THE INVENTION

1. Field of the Invention

This invention relates to a liquid crystal display apparatus including a protective plate and a liquid crystal display panel, and to a manufacturing method thereof.

2. Description of the Related Art

There has heretofore been known a liquid crystal display apparatus wherein a transparent protective plate for protecting the display surface of a liquid crystal display panel is bonded to the liquid crystal display panel through a resin layer so that the liquid crystal display panel and the protective plate are integrated.

Such a liquid crystal display apparatus undergoes the following process to integrate the protective plate and the liquid crystal display panel: The liquid crystal display panel and the protective plate are arranged face to face so that a space is made between the display surface of the liquid crystal display panel and the protective plate. Then, the space between the liquid crystal display panel and the protective plate is filled with a viscous unpolymerized resin. Further, the filling unpolymerized resin is polymerized and cured.

In the meantime, the liquid crystal display panel is structured so that an optical sheet such as a polarizing plate is affixed to a pair of substrates holding a liquid crystal layer in between. The unpolymerized resin is filled into the space formed between the protective plate and the optical sheet.

However, it has heretofore been the case that if the unpolymerized resin passes around the optical sheet when the unpolymerized resin is filled into the space, the unpolymerized resin adheres to the end face of the optical sheet because the end face of the optical sheet is exposed. That is, the unpolymerized resin or its solvent comes into contact with the end face of the optical sheet when the unpolymerized resin is filled into the space.

Here, the unpolymerized resin contains a solvent based on a hydrocarbon such as hexane that dissolves the unpolymerized resin. Moreover, the surface of the optical sheet is protected from the external environment by, for example, a coating material, but the end face of the optical sheet is exposed from the coating material because the optical sheet itself is cut into a predetermined size. This exposed portion is subject to adverse effects due to a solvent based on a hydrocarbon such as hexane.

Therefore, in the conventional liquid crystal display apparatus, faults such as cracks may be generated in the optical sheet due to the adhesion of the unpolymerized resin to the end face of the optical sheet with the passage of time after the protective place and the liquid crystal display panel are integrated.

BRIEF SUMMARY OF THE INVENTION

An object of the present invention is to provide a liquid crystal display apparatus and a manufacturing method of the same that prevent faults such as cracks from being generated in the optical sheet even if the unpolymerized resin contains a solvent based on a hydrocarbon such as hexane.

A liquid crystal display apparatus according to an aspect of the this invention includes: a liquid crystal display panel having a substrate to which an optical sheet is affixed, the area of the substrate being greater than the area of the optical sheet; a protective plate disposed so that the optical sheet intervenes between the protective plate and the substrate and so that a predetermined space is formed between the protective plate and the optical sheet; a spacer that has a predetermined thickness and that is provided between the liquid crystal display panel and the protective plate to enclose a screen area of the liquid crystal display panel and to be in close contact with the end face of the optical sheet; and a resin layer that is filled into the space corresponding to a region enclosed by the spacer and that is polymerized after filling.

A liquid crystal display apparatus according to another aspect of the this invention includes: a liquid crystal display panel having a substrate to which an optical sheet is affixed, the area of the substrate being greater than the area of the optical sheet; a protective plate disposed so that the optical sheet intervenes between the protective plate and the substrate and so that a predetermined space is formed between the protective plate and the optical sheet; a spacer that has a predetermined thickness and that is formed into a frame shape corresponding to the outer shape of the optical sheet and that is disposed between the liquid crystal display panel and the protective plate so that the edge of the optical sheet is located between the cuter shape of the frame and the inner shape of the frame; and a resin layer that is filled into the space corresponding to a region enclosed by the spacer and that is polymerized after filling.

A method of manufacturing a liquid crystal display apparatus according to an aspect of the this invention includes the steps of: preparing a liquid crystal display panel having a substrate to which an optical sheet is affixed, the area of the substrate being greater than the area of the optical sheet; installing, in the liquid crystal display panel, a spacer that has a predetermined thickness and that is formed into a frame shape corresponding to the outer shape of the optical sheet, the spacer being installed so that the edge of the optical sheet is located between the outer shape of the frame and the inner shape thereof; filling an unpolymerized resin onto the liquid crystal display panel in a region enclosed by the spacer; and polymerizing the unpolymerized resin after a protective plate is laid over the liquid crystal display panel.

According to the present invention, faults such as cracks are prevented from being generated in the optical sheet even if the unpolymerized resin contains a solvent based on a hydrocarbon such as hexane.

Advantages of the invention will be set forth in the description that follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is an enlarged sectional view of one end of a liquid crystal display apparatus showing a second embodiment of this invention;

FIG. 6 is a schematic plan view of a liquid crystal display apparatus showing a third embodiment of this invention.

DETAILED DESCRIPTION OF THE INVENTION

First Embodiment

Figure 1:
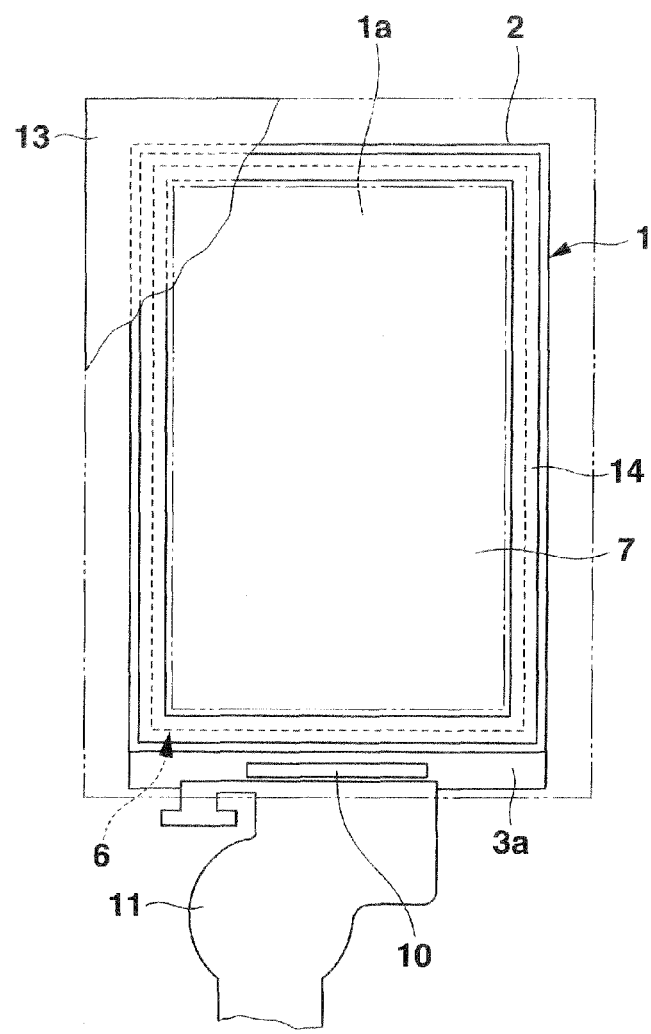
FIG. 1 is a schematic plan view of a liquid crystal display apparatus showing a first embodiment of this invention.
Figure 2:
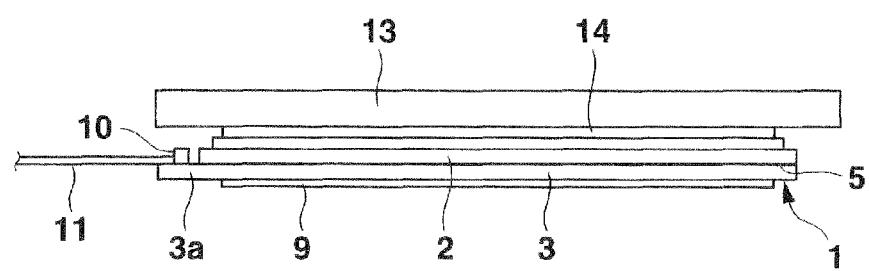
FIG. 2 is a schematic side view of the liquid crystal display apparatus in the first embodiment.
Figure 3:
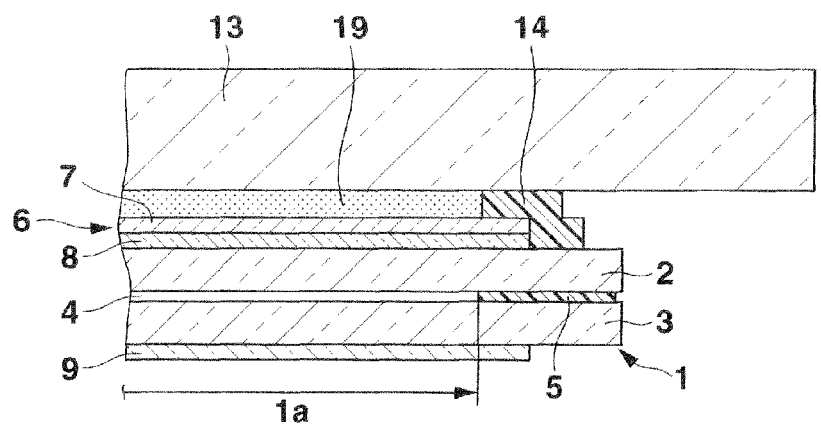
FIG. 3 is an enlarged sectional view of one end of the liquid crystal display apparatus in the first embodiment.

FIG. 1 to FIG. 3 show a first embodiment of this invention. Here, FIG. 1 is a schematic plan view of a liquid crystal display apparatus. FIG. 2 is a schematic side view of the liquid crystal display apparatus. FIG. 3 is an enlarged sectional view of one end of the liquid crystal display apparatus.

The liquid crystal display apparatus comprises a liquid crystal display panel 1 to display images, a protective plate 13 disposed to face the liquid crystal display panel 1, a spacer 14 that is provided between the liquid crystal display panel 1 and the protective plate 13 around a screen area 1a of the liquid crystal display panel 1 and that holds a predetermined space corresponding to the screen area 1a between the liquid crystal display panel 1 and the protective plate 13, and a resin layer 19 filled into the space that is surrounded by the spacer 14 and thus formed between the liquid crystal display panel 1 and the protective plate 13.

The liquid crystal display panel 1 is composed of a first substrate 2 and a second substrate 3 that are made of a transparent material and that are arranged face to face to leave a predetermined space therebetween, a liquid crystal layer 4 fitted into the space between the first substrate 2 and the second substrate 3, an optical sheet 6 that is affixed to the first substrate and that is disposed between the first substrate and the protective plate 13, and a first polarizing plate 9 affixed to the second substrate 3.

In addition, the liquid crystal display panel 1 can be, for example, an active matrix type liquid crystal display panel using a thin film transistor (TFT) as an active element.

Specifically, this liquid crystal display panel is provided with, for example, a plurality of pixel electrodes (first electrodes) that are arranged in matrix form on the liquid-crystal-layer-side surface of the second substrate 3 corresponding to the screen area 1a so that one pixel electrode corresponds to one display electrode, a plurality of TFTs that are arranged so that one TFT corresponds to each of the plurality of pixel electrodes and that are connected to the corresponding pixel electrodes, a plurality of scanning lines that supply gate signals to the respective TFTs in the respective rows, and a plurality of signal lines that supply data signals to the plurality of TFTs in the respective rows.

Furthermore, on the liquid-crystal-layer-side surface of the first substrate 2, there are provided an opposed electrode (second electrode) formed to face the entire region where the plurality of pixel electrodes are arranged, and three color filters disposed so that one of red, green and blue corresponds to one display electrode.

In addition, a projection 3a projecting from the first substrate 2 is formed in the second substrate 3.

Furthermore, a driver element 10 is mounted on the projection 3a, and this driver element 10 sequentially applies the gate signals to the plurality of scanning lines and applies the data signals to the plurality of signal lines. Further, a flexible substrate 11 is connected to the end of the projection 3a. In the flexible substrate 11, a wiring line to supply a driver control signal from an external circuit to the driver element 10 is formed.

Here, the first substrate 2 and the second substrate 3 are joined together through a seal material 5 in a frame shape enclosing the screen area 1a. Further, liquid crystal is hermetically contained in the region enclosed by the seal material 5 in the space between the first substrate 2 and the second substrate 3, such that the liquid crystal layer 4 is formed.

The initial alignment state of liquid crystal molecules in the liquid crystal layer 4 is controlled by a first alignment film applied to the second substrate 3 over the pixel electrodes and by a second alignment film applied to the first substrate 2 over the opposed electrode.

In addition, the liquid crystal display panel 1 may be any one of the following liquid crystal display panels: a TN type or STN type liquid crystal display panel in which liquid crystal molecules are in twist alignment between the first substrate 2 and the second substrate 3 in the initial alignment state, a vertical alignment type liquid crystal display panel in which liquid crystal molecules are aligned substantially perpendicularly to the surfaces of the substrates 2, in the initial alignment state, a nontwist horizontal alignment type liquid crystal display panel in which liquid crystal molecules are aligned in one direction substantially in parallel to the surfaces of the substrates 2, 3 in the initial alignment state, and a bend alignment type liquid crystal display panel in which liquid crystal molecules are in bend alignment in the initial alignment state. Alternatively, the liquid crystal display panel 1 may be a liquid crystal display panel in which liquid crystal molecules have ferroelectric or antiferroelectric properties.

Furthermore, in the liquid crystal display panel 1 according to this embodiment, the plurality of pixel electrodes are provided in the second substrate 3, and the opposed electrode is provided in the first substrate 2. Otherwise, the liquid crystal display panel 1 may be a lateral-field control type liquid crystal display panel. This liquid crystal display panel is provided with a plurality of first electrodes for forming a plurality of pixels so that the pixels are arranged in matrix form in one of the first substrate 2 and the second substrate 3, a second electrode having a plurality of elongate electrode portions that are formed closer to the side of the liquid crystal layer 4 than the first electrodes in such a manner as to be insulated from the first electrodes, a plurality of TFTs that are arranged so that each TFT corresponds to each of the plurality of first electrodes and that are connected to the corresponding first electrodes, a plurality of scanning lines that supply gate signals to the respective TFTs in the respective rows, and a plurality of signal lines that supply data signals to the plurality of TFTs in the respective rows. A lateral electric field (an electric field directed along the surface of the substrate) is generated across the plurality of first electrodes and the second electrode to change the alignment of liquid crystal molecules.

The optical sheet 6 is composed of a polarizing plate (hereinafter referred to as a second polarizing plate) 7 in which a polarizing layer is interposed between a pair of protective films, and a retardation plate 8 that is disposed between the second polarizing plate 7 and the first substrate 2 and that improves, for example, the viewing angle characteristics of the liquid crystal display panel 1.

The outside size of the optical sheet 6 is smaller than the outside size of the first substrate 2. The optical sheet 6 is affixed to the region corresponding to the screen area 1a in the first substrate 2 in such a manner as to avoid the peripheral portion of the first substrate 2.

Moreover, the first polarizing plate 9 is formed so that its outside size is substantially the same as the outside size of the optical sheet 6. The first polarizing plate 9 is affixed to the region corresponding to the screen area 1a in the second substrate 3 in such a manner as to avoid the peripheral portion and the projection 3a of the second substrate 3.

The protective plate 13 is made of hardened glass or a transparent resin plate of high strength, and has an area sufficient to cover the entire display surface of the liquid crystal display panel 1. For example, the outside size of the protective plate 13 is greater than the outside size of the first substrate 2 in the liquid crystal display panel 1.

Furthermore, the protective plate 13 is located to face both the region where the optical sheet 6 is affixed to the first substrate and the region where the first substrate is exposed from the optical sheet 6.

The spacer 14 is provided in the region enclosing the screen area 1a of the liquid crystal display panel 1 to correspond to at least the peripheral portion of the optical sheet 6, and is in close contact with the optical sheet 6 and the protective plate 13.

The spacer 14 is made of a resin film. The spacer 14 has a thickness corresponding to the thickness of the resin layer 19 provided between the liquid crystal display panel 1 and the protective plate 13. The spacer 14 is formed as a frame shaped in accordance with the outer shape of the optical sheet 6. Here, each of the sides constituting the frame of the spacer 14 has a predetermined width. Moreover, the spacer 14 is disposed so that the edge of the optical sheet 6 is received within the width of the frame the region corresponding to the edge of the optical sheet 6. That is, the spacer 14 is disposed to cover the end face (side surface) of the optical sheet 6 all around.

In addition, the frame of the spacer 14 is sized so that the edge of the optical sheet is located right in the intermediate position between the outer shape of the frame and the inner shape thereof when the center of the frame coincides with the center of the optical sheet. Further, the spacer 14 is disposed so that the edge of the optical sheet is located between the outer shape of the frame and the inner shape thereof.

That is, the spacer 14 is provided to correspond to the whole peripheral portion of the optical sheet 6 and to correspond to the region extending from the peripheral portion of the optical sheet 6 of the first substrate 2 to the peripheral portion of the optical sheet 6.

Furthermore, the resin film forming the spacer 14 is formed as, for example, a pressure sensitive adhesive double coated film in which a pressure sensitive adhesive material is applied to both surfaces thereof. Moreover, in the direction of the width of the frame, the spacer 14 follows a step formed by the edge of the optical sheet 6 to bend and thus cover the end face (side surface) of the optical sheet 6. The spacer 14 also bonds the optical sheet 6 or the first substrate 2 to the protective plate 13.

The resin layer 19 is made of, for example, a thermopolymerizing resin. The resin layer 19 is filled into the region enclosed by the spacer 14 in the space between the liquid crystal display panel 1 and the protective plate 13, and is polymerized after filling to bond the liquid crystal display panel 1 and the protective plate 13 together.

In this liquid crystal display apparatus, the spacer 14 made of the resin film (pressure sensitive adhesive double coated film) is affixed to the display surface of the liquid crystal display panel 1, and then an unpolymerized resin (a resin liquid containing a thermopolymerizing resin or solvent) is supplied to the region enclosed by the spacer 14 on the display surface of the liquid crystal display panel 1, for example, by dropping with a dispenser, by transfer or by screen printing. Further, the protective plate 13 is laid on the supplied unpolymerized resin and pressurized. Thereby, the unpolymerized resin is pressed and expanded by the protective plate 13 and thus is filled into the entire region enclosed by the spacer 14. At the same time, the protective plate 13 is affixed to the spacer 14. In this condition, the resin is polymerized by heating. In this way, the protective plate 13 and the liquid crystal display panel 1 are integrated.

That is, the process of manufacturing the liquid crystal display apparatus comprises the step of integrating the protective plate 13 and the liquid crystal display panel 1.

The step of integrating the protective plate 13 and the liquid crystal display panel 1 further comprises the steps of preparing a liquid crystal display panel having a substrate to which an optical sheet is affixed, the area of the substrate being greater than the area of the optical sheet; installing, in the liquid crystal display panel, a spacer that has a predetermined thickness and that is formed into a frame shape corresponding to the outer shape of the optical sheet, the spacer being installed so that the edge of the optical sheet is located between the outer shape of the frame and the inner shape thereof; filling an unpolymerized resin onto the liquid crystal display panel in a region enclosed by the spacer; and polymerizing the unpolymerized resin after a protective plate is laid over the liquid crystal display panel.

In addition, when the unpolymerized resin contains a solvent, it is preferable to evaporate the solvent after supplying the unpolymerized resin to the region enclosed by the spacer 14 and then lay the protective plate 13.

At the same time, it is also preferable to set the supply amount of the unpolymerized resin so that the amount of the resin after the evaporation of the solvent corresponds to the volume of the region that is specified by the spacer 14 and that is enclosed by the spacer 14 in the space between the liquid crystal display panel 1 and the protective plate 13.

In the liquid crystal display apparatus described above, the spacer 14 enclosing the screen area 1a of the liquid crystal display panel 1 to specify the space between the liquid crystal display panel 1 and the protective plate 13 is provided between the liquid crystal display panel 1 and the protective plate 13 to cover at least the end face of the optical sheet. This spacer 14 is in contact with the surfaces of the optical sheet 6 and the protective plate 13 that face each other. Thus, in the step of integrating the protective plate 13 and the liquid crystal display panel 1, the unpolymerized resin supplied to the region enclosed by the spacer 14 on the display surface of the liquid crystal display panel 1, or its solvent does not pass around the optical sheet 6 to adhere to the end face of the optical sheet 6. That is, the unpolymerized resin or its solvent does not come into contact with the end face of the optical sheet 6.

Consequently, according to the liquid crystal display apparatus described above, even if the unpolymerized resin contains a solvent based on a hydrocarbon such as hexane, the liquid crystal display panel 1 and the protective plate 13 can be joined together by the resin layer 19 filled into the space between the liquid crystal display panel 1 and the protective plate 13 without, any adverse effects on the optical sheet 6 affixed to the first substrate 2.

That is, the optical sheet 6 affixed to the first substrate 2 is composed of the second polarizing plate 7 and the retardation plate 8 that is disposed between the second polarizing plate 7 and the first substrate 2. Therefore, if the unpolymerized resin or its solvent comes into contact with the end face of the optical sheet 6, faults such as cracks are generated in, for example, the second polarizing plate 7 with the passage of time. However, according to the liquid crystal display panel integrated with the protective plate, when the protective plate 13 and the liquid crystal display panel 1 are integrated, the spacer 14 can prevent the unpolymerized resin or its solvent from coming into contact with the end face of the optical sheet 6. As a result, it is possible to prevent the generation of faults such as cracks in the optical sheet, for example, the second polarizing plate 7.

Furthermore, in the liquid crystal display apparatus according to the embodiment described above, the optical sheet 6 is formed into a shape smaller than the outer shape of the first substrate 2, and then affixed to the region of the first substrate 2 except for its peripheral portion. The spacer 14 is provided in the region extending from the peripheral portion of the first substrate 2 to the peripheral portion of the optical sheet 6 in such a manner as to cover the end face of this region. This further ensures that, for example, the unpolymerized resin can be prevented from passing around the optical sheet 6.

Still further, in the liquid crystal display apparatus according to the embodiment described above, the spacer 14 is made of a resin film formed into a frame shape corresponding to the peripheral portion of the optical sheet 6. The spacer 14 is bent in accordance with the step between the outer surface of the peripheral portion of the first substrate 2 of the liquid crystal display panel 1 and the outer surface of the peripheral portion of the optical sheet 6, and is thus affixed to the peripheral portion of the first substrate 2 and the peripheral portion of the optical sheet 6. Thus, even if the unpolymerized resin supplied to the region enclosed by the spacer 14 on the display surface of the liquid crystal display panel 1 climbs over the spacer 14 and runs off, the unpolymerized resin does not adhere to the end face of the optical sheet 6. This further ensures that the unpolymerized resin can be prevented from coming into contact with the end face of the optical sheet 6.

Further yet, in the liquid crystal display apparatus according to the embodiment described above, the end face of the optical sheet 6 can be kept covered with the spacer 14 even after the step of integrating the protective plate 13 and the liquid crystal display panel 1. Thus, the end face of the optical sheet 6 can be protected from external influences even after the step of integrating the protective plate 13 and the liquid crystal display panel 1.

In addition, in the first embodiment described above, the spacer 14 is formed into an endless frame shape corresponding to the whole peripheral portion of the optical sheet 6. However, the spacer 14 may be formed into a discontinuous frame shape provided with voids in parts corresponding to a plurality of places of the peripheral portion of the optical sheet 6 so that the region enclosed by the spacer 14 in the space between the liquid crystal display panel 1 and the protective plate 13 is in communication with the outside.

Figure 4:
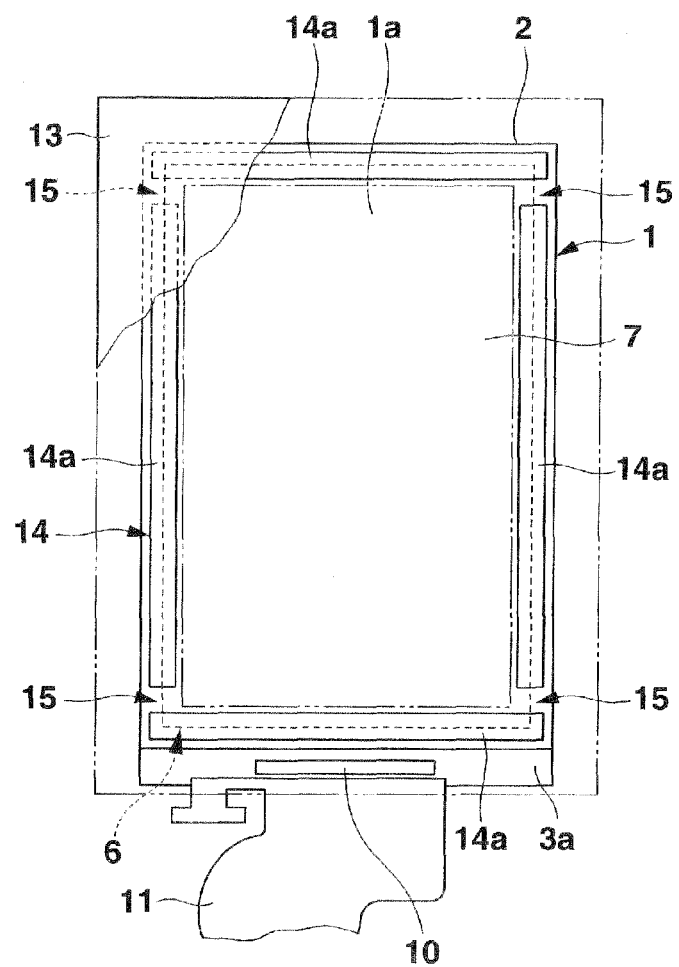
FIG. 4 is a schematic plan view of a liquid crystal display apparatus showing a modification of the first embodiment.

FIG. 4 is a plan view of a liquid crystal display apparatus showing a modification of the first embodiment described above. In this modification, the spacer 14 is formed into a discontinuous frame shape provided with voids 15 in parts corresponding to a plurality of places, for example, four corners of the peripheral portion of the optical sheet 6 so that the region enclosed by the spacer 14 in the space between the liquid crystal display panel 1 and the protective plate 13 is in communication with the outside. In addition, in FIG. 4, regions in the spacer 14 separated by the voids 15 are indicated by 14a.

According to the liquid crystal display apparatus in this modification, in the step of integrating the protective plate 13 and the liquid crystal display panel 1, the region enclosed by the spacer 14 on the display surface of the liquid crystal display panel 1 is supplied with an amount of an unpolymerized resin greater than an amount corresponding to the volume of the region that is specified by the spacer 14 and that is enclosed by the spacer 14 in the space between the liquid crystal display panel 1 and the protective plate 13. The supplied unpolymerized resin is pressed and expanded so that the extra resin is discharged to the outside through the plurality of voids 15. Thus, the unpolymerized resin can be filled into the entire region enclosed by the spacer 14.

Furthermore, in the first embodiment described above, the pressure sensitive adhesive double coated film is used as the resin film that forms the spacer 14. This resin film is not limited to the pressure sensitive adhesive double coated film, and may be a pressure sensitive adhesive single coated film in which a pressure sensitive adhesive material is applied to one surface thereof. In this case, the surface of this pressure sensitive adhesive single coated film onto which the pressure sensitive adhesive material is applied has only to be affixed to the peripheral portion of the first substrate 2 of the liquid crystal display panel 1 and to the peripheral portion of the optical sheet 6. Part of the other surface corresponding to the peripheral portion of the optical sheet 6 has only to be pressed against and thus put into close contact with the protective plate 13.

Still further, in the embodiment described above, the optical sheet 6 is formed into a shape smaller than the outer shape of the first substrate 2, and then affixed to the region of the first substrate 2 except for its peripheral portion. The spacer 14 is provided to correspond to the region extending from the peripheral portion of the first substrate 2 to the peripheral portion of the optical sheet 6. However, the spacer 14 may be provided to only correspond to the end face of the peripheral portion of the optical sheet 6. In this case, the optical sheet 6 may be formed into a shape substantially equal to the outer shape of the first substrate 2 and affixed to the substantially whole first substrate 2.

Further yet, in the embodiment described above, the resin layer 19 for joining the liquid crystal display panel 1 and the protective plate 13 together is formed of a thermopolymerizing resin. However, the resin layer 19 may be formed of a photopolymerizing resin, or a resin having both photopolymerization properties and thermopolymerization properties.

Second Embodiment

FIG. 5 is an enlarged sectional view of one end of a liquid crystal display apparatus showing a second embodiment of this invention. It is to be noted that, in this embodiment, parts corresponding to the parts in the first embodiment described above are provided with the same reference numerals in the drawing, and the same parts are not described.

In the liquid crystal display apparatus according to this embodiment, an optical sheet 6 is affixed to a first substrate 2 of a liquid crystal display panel 1. This optical sheet 6 is made of a laminated sheet composed of a second polarizing plate 7 and a retardation plate 8. The end faces of the second polarizing plate 7 and the retardation plate 8 are covered all round with an airtight sealing material 12 made of, for example, a silicon resin or an epoxy resin. A spacer 16 is provided between the liquid crystal display panel 1 and a protective plate 13. This spacer 16 encloses a screen area 1a of the liquid crystal display panel 1 to specify the space between the liquid crystal display panel 1 and the protective plate 13. The configuration is the same in other respects as the configuration in the first embodiment described above.

In this embodiment, the optical sheet 6 is formed into a shape smaller than the outer shape of the first substrate 2, and affixed to the region of the first substrate 2 except for its peripheral portion. The spacer 16 is provided in the region enclosing the screen area 1a of the liquid crystal display panel 1 to the edge of the optical sheet 6, and is in close contact with the surfaces of the optical sheet 6 and the protective plate 13 that face each other.

The spacer 16 is made of a resin film formed into an endless frame shape corresponding to the whole peripheral portion of the optical sheet 6 or a discontinuous frame shape similar to that in the modification (see FIG. 4) of the first embodiment described above. Each side of the frame is formed to have a width corresponding to the region extending from the peripheral portion of the first substrate 2 of the liquid crystal display panel 1 (a part outside the optical sheet 6) to the peripheral portion of the optical sheet 6. In addition, in this embodiment, each side of the spacer 16 is formed to have such a width that the outer edge of the side corresponds to the vicinity of an intermediate position between the peripheral portion of the first substrate 2 and the peripheral portion of the optical sheet 6.

That is, the spacer 16 corresponds to the whole peripheral portion of the optical sheet 6, and is provided in the region extending from the peripheral portion of the optical sheet 6 of the first substrate 2 to the peripheral portion of the optical sheet 6 to cover the edge of this region.

Furthermore, the resin film forming the spacer 16 is, for example, a pressure sensitive adhesive double coated film in which a pressure sensitive adhesive material (not shown) is applied to both surfaces thereof. The inner peripheral part of one surface of each side of this spacer is affixed to the peripheral portion of the optical sheet 6, and the entire other surface is affixed to the protective plate 13.

Moreover, the liquid crystal display panel 1 and the protective plate 13 are joined together by a resin layer 19 that is filled into the region enclosed by the spacer 16 in the space between the liquid crystal display panel 1 and the protective plate 13 and that is polymerized after filling.

This liquid crystal display apparatus is manufactured by the following method: The spacer 16 made of the resin film (pressure sensitive adhesive double coated film) is affixed to one of the liquid crystal display panel 1 and the protective plate 13, for example, to the surface of the protective plate 13 that faces the liquid crystal display panel. Then, an unpolymerized resin (a thermopolymerizing resin, a photopolymerizing resin, or a resin having both photopolymerization properties and thermopolymerization properties) is supplied in the region enclosed by the spacer 16 on the surface of the protective plate 13 that faces the liquid crystal display panel. If the unpolymerized resin contains a solvent, this solvent is evaporated, and then the liquid crystal display panel 1 is laid on the supplied unpolymerized resin and pressurized. Thereby, the unpolymerized resin is pressed and expanded by the protective plate 13 to be filled into the entire region enclosed by the spacer 16. At the same time, the peripheral portion of the optical sheet 6 of the liquid crystal display panel 1 is affixed to the spacer 16. In this condition, the unpolymerized resin is polymerized.

In addition, the liquid crystal display apparatus according to this embodiment can also manufactured by the following method: The spacer 16 is affixed onto the display surface of the liquid crystal display panel 1. The unpolymerized resin is supplied to the region enclosed by the spacer 16 on the display surface of the liquid crystal display panel 1. If the unpolymerized resin contains a solvent, this solvent is evaporated, and then the protective plate 13 is laid on the supplied unpolymerized resin and pressurized. Thereby, the unpolymerized resin is filled into the entire region enclosed by the spacer 16. At the same time, the protective plate 13 is affixed to the spacer 16. In this condition, the resin is polymerized.

In the liquid crystal display apparatus according to this embodiment, the spacer 16 enclosing the screen area 1a of the liquid crystal display panel 1 to specify the space between the liquid crystal display panel 1 and the protective plate 13 is provided between the liquid crystal display panel 1 and the protective plate 13 to cover at least the edge of the peripheral portion of the optical sheet 6. This spacer 16 is in close contact with the surfaces of the optical sheet 6 and the protective place 13 that face each other. Thus, in the manufacture of the liquid crystal display apparatus described above, the unpolymerized resin supplied to the region enclosed by the spacer 16 on the display surface of the liquid crystal display panel 1 does not pass around the optical sheet 6 to adhere to the end face of the optical sheet 6. Therefore, without any adverse effects on the optical sheet 6 provided on the display surface of the liquid crystal display panel 1, the liquid crystal display panel 1 and the protective plate 13 can be joined together by the resin layer 19 that is filled into the space between the liquid crystal display panel 1 and the protective plate 13 and that is polymerized after filling.

Furthermore, in this liquid crystal display apparatus, the end face of the optical sheet 6 is previously covered all round with the airtight sealing material 12. Thus, even if the unpolymerized resin supplied to the region enclosed by the spacer 16 on the surface of at least one of the liquid crystal display panel 1 and the protective plate 13 climbs over the spacer 16 and runs off, the prevention of the adhesion of the unpolymerized resin to the end face of the optical sheet 6 can be further ensured.

Third Embodiment

Figure 7:
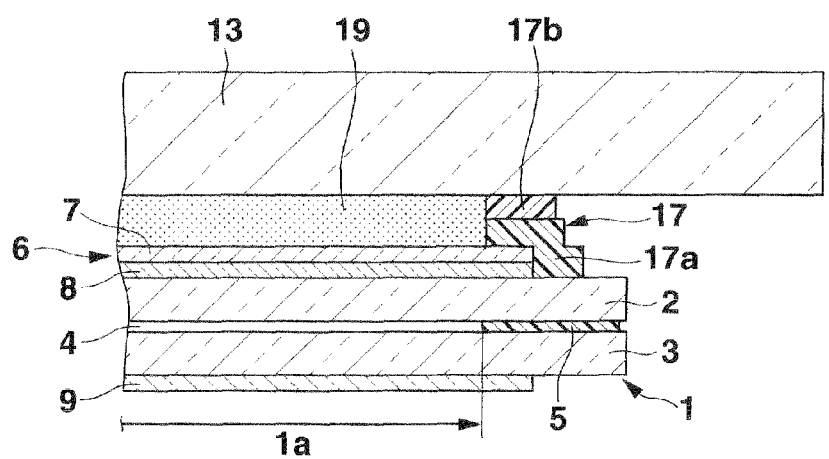
FIG. 7 is an enlarged sectional view of one end of the liquid crystal display apparatus in the third embodiment.

FIG. 6 and FIG. 7 show a third embodiment of this invention. FIG. 6 is a plan view of a liquid crystal display apparatus. FIG. 7 is an enlarged sectional view of one end of the liquid crystal display apparatus. It is to be noted that, in this embodiment, parts corresponding to the parts in the first embodiment described above are provided with the same reference numerals in the drawings, and the same parts are not described.

In the liquid crystal display apparatus according to this embodiment, the space between a liquid crystal display panel 1 and a protective plate 13 is specified by a spacer 17 composed of a first resin film 17a and a second resin film 17b stacked on one surface of the first resin film 17a. The configuration is the same in other respects as the configuration in the first embodiment described above.

In this embodiment, of the first and second resin films 17a, 17b constituting the spacer 17, the first resin film 17a is formed into an endless frame shape corresponding to the whole peripheral portion of an optical sheet (a laminated sheet composed of a second polarizing plate 7 and a retardation plate 8) 6 affixed to the outer surface of a first substrate 2 of the liquid crystal display panel 1. Each side of the frame is formed to have a width corresponding to the region extending from the peripheral portion of the first substrate 2 of the liquid crystal display panel 1 (a part outside the optical sheet 6) to the peripheral portion of the optical sheet 6. In addition, in this embodiment, each side of the first resin film 17a is formed to have such a width that the outer edge of the side corresponds to the vicinity of an intermediate position between the peripheral portion of the first substrate 2 and the peripheral portion of the optical sheet 6.

The first resin film 17a is a pressure sensitive adhesive single coated film in which a pressure sensitive adhesive material (not shown) is applied to one surface thereof. Each side thereof is bent in accordance with the step between the outer surface the peripheral portion the first substrate 2 and the outer surface of the peripheral portion of the optical sheet 6, so that the one surface is affixed to the peripheral portion of the first substrate 2 and the peripheral portion of the optical sheet 6.

Furthermore, the second resin film 17b is formed into a discontinuous frame shape provided with voids 18 in parts corresponding to a plurality of places of the peripheral portion of the optical sheet 6 so that the region enclosed by the spacer 17 in the space between the liquid crystal display panel 1 and the protective plate 13 is in communication with the outside. The second resin film 17b is stacked on at least a part corresponding to the peripheral portion of the optical sheet 6 on the surface of the first resin film 17a facing the protective plate 13.

In addition, in this embodiment, each side of the second resin film 17b is formed into a width corresponding to the peripheral portion of the optical sheet 6, and the voids 18 are formed in parts corresponding to four corners of the peripheral portion of the optical sheet 6 and in parts between both end portions and central portions of the respective sides.

The second resin film 17b is a pressure sensitive adhesive double coated film in which a pressure sensitive adhesive material (not shown) is applied to both surfaces thereof. One surface of this film is affixed to the inner peripheral part of each side of the first resin film 17a, that is, a part corresponding to the peripheral portion of the optical sheet 6, and the other surface is affixed to the protective plate 13.

In addition, the liquid crystal display apparatus according to this embodiment is basically manufactured in a process similar to the process of manufacturing the liquid crystal display apparatus in the first embodiment described above. However, with regard to the first and second resin films 17a, 17b constituting the spacer 17, the resin films 17a, 17b that have been affixed to each other in advance may be affixed to the liquid crystal display panel 1. Otherwise, the first resin film 11a may be first affixed to the liquid crystal display panel 1, onto which the second resin film 17b may be then affixed.

Furthermore, this liquid crystal display apparatus may be manufactured by the following method: The first resin film 17a is affixed to the liquid crystal display panel 1, and the second resin film 17b is affixed to the protective plate 13. An unpolymerized resin supplied to the region of the first resin film 17a on the display surface of the liquid crystal display panel 1. If the unpolymerized resin contains a solvent, this solvent is evaporated, and then the protective plate 13 is laid on the supplied unpolymerized resin and pressurized. Thereby, the unpolymerized resin is filled into the entire region enclosed by the spacer 16. At the same time, the first resin film 17a and the second resin film 17b are affixed to each other to form the spacer 17.

The liquid crystal display apparatus according to this embodiment has the configuration described above. Thus, as in the liquid crystal display apparatus according to the first embodiment, without any adverse effects on the optical sheet 6 provided on the display surface of the liquid crystal display panel 1, the liquid crystal display panel 1 and the protective plate 13 can be joined together by the resin layer 19 that is filled into the space between the liquid crystal display panel 1 and the protective plate 13 and that is polymerized after filling.

Moreover, in the liquid crystal display apparatus according to this embodiment, the spacer 17 is formed by the first resin film 17a and the second resin film. The first resin film 17a is formed into an endless frame shape corresponding to the whole peripheral portion of the optical sheet 6. The first resin film 17a is bent in accordance with the step between the outer surface of the peripheral portion of the first substrate 2 of the liquid crystal display panel 1 and the outer surface of the peripheral portion of the optical sheet 6, and is thus affixed to the peripheral portion of the first substrate 2 and the peripheral portion of the optical sheet 6. The second resin film is formed into a discontinuous frame shape provided with the voids in parts corresponding to a plurality of places of the peripheral portion of the optical sheet so that the region enclosed by the spacer in the space between the liquid crystal display panel and the protective plate is in communication with the outside. The second resin film is stacked on at least a part corresponding to the peripheral portion of the optical sheet on the surface of the first resin film that faces the protective plate. Thus, even if the unpolymerized resin supplied to the region enclosed by the spacer 17 on the surface of the liquid crystal display panel 1 flows out through the voids 18 of the spacer 17, the prevention of the adhesion of the unpolymerized resin to the end face of the optical sheet 6 can be ensured.

Thus, according to the liquid crystal display apparatus in this embodiment, the voids 18 for discharging the extra amount of the resin filled into the region enclosed by the spacer 17 in the space between the liquid crystal display panel 1 and the protective plate 13 can be distributed at a great number of places, as compared with the modification of the first embodiment shown in FIG. 4. Thus, a greater amount of the unpolymerized resin is supplied to the region enclosed by the spacer 17 on the display surface of the liquid crystal display panel 1 than the amount corresponding to the volume of the region that is specified by the spacer 17 and that is enclosed by the spacer 17 in the space between the liquid crystal display panel 1 and the protective plate 13. If the unpolymerized resin contains a solvent, this solvent is evaporated, and then the supplied unpolymerized resin is pressed and expanded so that the extra resin is discharged to the outside through the voids 18 at the plurality of places. This ensures that the unpolymerized resin can be filled into the entire region enclosed by the spacer 17.

Furthermore, the end face of the optical sheet 6 can be kept covered with the first resin film 17a even after the step of integrating the protective plate 13 and the liquid crystal display panel 1. Thus, the end face of the optical sheet 6 can be protected from external influences even after the step of integrating the protective plate 13 and the liquid crystal display panel 1.

In addition, the liquid crystal display apparatus in each of the embodiments described above may be configured so that the protective plate 13 is disposed face to face with the liquid crystal display panel 1 on the side where a user observes images displayed on the liquid crystal display panel 1, or may be configured so that the liquid crystal display panel 1 is disposed face to face with the protective plate 13 on the side where the user observes images displayed on the liquid crystal display panel 1.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A liquid crystal display apparatus comprising:
a liquid crystal display panel having a substrate to which an optical sheet is affixed, the area of the substrate being greater than the area of the optical sheet;
a protective plate disposed so that the optical sheet intervenes between the protective plate and the substrate and so that a predetermined space is formed between the protective plate and the optical sheet;
a spacer that defines a thickness of the predetermined space, wherein the spacer has a frame shape corresponding to an outer shape of the optical sheet and is disposed between the optical sheet and the protective plate such that the spacer is located on edges of the optical sheet and such that inner end faces of the spacer are located inward relative to outer end faces of the optical sheet; and
a resin layer that is filled into the predetermined space in a region enclosed by the spacer, and that is polymerized after filling.

2. The liquid crystal display apparatus according to claim 1, wherein the spacer covers the outer end faces of the optical sheet all around the optical sheet.

3. The liquid crystal display apparatus according to claim 1, wherein the spacer is located on the edges of the optical sheet all around the optical sheet.

4. The liquid crystal display apparatus according to claim 1, wherein the spacer has a void formed therein through which a region inside the frame shape is in communication with a region outside the frame shape.

5. The liquid crystal display apparatus according to claim 1, wherein the outer end faces of the optical sheet are covered with an airtight sealing material that is different from the spacer.

6. The liquid crystal display apparatus according to claim 5, wherein the sealing material contains a silicon resin or an epoxy resin.

7. The liquid crystal display apparatus according to claim 1, wherein the spacer comprises a first layer and a second layer which are stacked, the first layer covering the outer end faces of the 5 optical sheet all around the optical sheet, and the second layer having a void formed therein through which a region inside the frame shape is in communication with a region outside the frame shape.

8. The liquid crystal display apparatus according to claim 7, wherein the optical sheet has a quadrangular shape, and one or more voids are formed in the second layer of the spacer on each side of the optical sheet.

9. The liquid crystal display apparatus according to claim 7, wherein the spacer has a comprises a first resin film and a second resin film which are stacked, the first resin film covering the outer end faces of the optical sheet all around the optical sheet, and the second resin film having a void formed therein through which a region inside the frame shape is in communication with a region outside the frame shape.

10. The liquid crystal display apparatus according to claim 9, wherein the optical sheet has a quadrangular shape, and one or more voids are formed in the second resin film on each side of the optical sheet.

* * * * *

UNITED STATES PATENT AND TRADEMARK OFFICE
CERTIFICATE OF CORRECTION

PATENT NO.        : 8,755,001 B2
APPLICATION NO.   : 12/632974
DATED             : June 17, 2014
INVENTOR(S)       : Tatsuhito Harada et al.

It is certified that error appears in the above-identified patent and that said Letters Patent is hereby corrected as shown below:

In the Claims

Column 14, Claim 7, Line 13:

after "of the" delete "5".

Column 14, Claim 9, Lines 21 and 22:

delete "claim 7" and insert --claim 1--.

Column 14, Claim 9, Line 22:

after "spacer" delete "has a".

Signed and Sealed this
Twentieth Day of January, 2015

Michelle K. Lee
*Deputy Director of the United States Patent and Trademark Office*